US012378926B2

(12) United States Patent
Miyauchi

(10) Patent No.: US 12,378,926 B2

(45) Date of Patent: Aug. 5, 2025

(54) MISFIRE DETECTION APPARATUS AND MISFIRE DETECTION METHOD FOR MULTI-CYLINDER ENGINE

(71) Applicant: Honda Motor Co., Ltd., Tokyo (JP)

(72) Inventor: Tomohiro Miyauchi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 18/291,911

(22) PCT Filed: Jul. 28, 2021

(86) PCT No.: PCT/JP2021/027854

§ 371 (c)(1),
(2) Date: Jan. 24, 2024

(87) PCT Pub. No.: WO2023/007604

PCT Pub. Date: Feb. 2, 2023

(65) Prior Publication Data

US 2024/0384691 A1 Nov. 21, 2024

(51) Int. Cl.

*F02D 41/14* (2006.01)
*F02B 75/02* (2006.01)

(Continued)

(52) U.S. Cl.

CPC .......... *F02D 41/1497* (2013.01); *F02B 75/02* (2013.01); *F02B 75/22* (2013.01);

(Continued)

(58) Field of Classification Search

CPC ............. F02D 41/1497; F02D 41/0002; F02D 41/1446; F02D 41/38; F02D 2200/101;

(Continued)

(56) References Cited

U.S. PATENT DOCUMENTS

2017/0167424 A1* 6/2017 Glugla ................ F02D 41/3005

FOREIGN PATENT DOCUMENTS

BR 102014007421 A2 * 7/2015
JP S62228128 A 10/1987

(Continued)

OTHER PUBLICATIONS

Machine Translation of BR102014007421A2 PDF File Name: "BR102014007421A2_Machine_Translation.pdf" (Year: 2015).*

(Continued)

*Primary Examiner* — Lindsay M Low
*Assistant Examiner* — Ruben Picon-Feliciano
(74) *Attorney, Agent, or Firm* — Duft & Bornsen, PC

(57) ABSTRACT

A misfire detection apparatus for multi-cylinder engine is configured to detect a misfiring state in which any of a plurality of cylinders in an engine is misfiring, the engine including: the plurality of cylinders, and a catalyst device configured to purify exhaust gas from the plurality of cylinders. The apparatus includes: a rotation sensor configured to detect a rotational speed of the engine, and an electronic control unit including a processor and a memory coupled to the processor and configured to control operation of the engine. The processor detects the misfiring state of the engine based on the rotational speed of the engine detected by the rotation sensor.

7 Claims, 11 Drawing Sheets

(51) Int. Cl.
*F02B 75/18* (2006.01)
*F02B 75/22* (2006.01)
*F02D 41/00* (2006.01)
*F02D 41/38* (2006.01)

(52) U.S. Cl.
CPC ..... *F02D 41/0002* (2013.01); *F02D 41/1446* (2013.01); *F02D 41/38* (2013.01); *F02B 2075/027* (2013.01); *F02B 2075/1808* (2013.01); *F02D 2200/101* (2013.01)

(58) Field of Classification Search
CPC .... F02B 75/02; F02B 75/22; F02B 2075/027; F02B 2075/1808
See application file for complete search history.

(56) References Cited

FOREIGN PATENT DOCUMENTS

| | | | | | |
|---|---|---|---|---|---|
| JP | H03286168 | A | | 12/1991 | |
| JP | H06280671 | A | * | 10/1994 | |
| JP | H09151723 | A | | 6/1997 | |
| JP | 2000291485 | A | | 10/2000 | |
| JP | 2010144619 | A | | 7/2010 | |
| JP | 2013155672 | A | | 8/2013 | |
| JP | 2013209951 | A | | 10/2013 | |
| JP | 2015059485 | A | | 3/2015 | |
| JP | 2019120187 | A | | 7/2019 | |
| JP | 2020063710 | A | | 4/2020 | |
| JP | 2020203606 | A | * | 12/2020 | ............ B60W 10/06 |
| WO | WO-2021084917 | A1 | * | 5/2021 | ............ F01N 11/002 |

OTHER PUBLICATIONS

Machine Translation of JPH06280671A PDF File Name: “JPH06280671A_Machine_Translation.pdf” (Year: 1994).*
Machine Translation of WO 2021084917 A1 PDF File Name: “WO2021084917A1_Machine_Translation.pdf” (Year: 2021).*
Machine Translation of JP 2020203606 A PDF File Name: “JP2020203606A_Machine_Translation.pdf” (Year: 2020).*
International Preliminary Examination Report; Application PCT/JP2021/027854; Jun. 27, 2023.
International Search Report; Application PCT/JP2021/027854; Sep. 28, 2021.

* cited by examiner

MISFIRE DETECTION APPARATUS AND MISFIRE DETECTION METHOD FOR MULTI-CYLINDER ENGINE

CROSS-REFERENCE TO RELATED APPLICATION

This application is a National Stage of PCT international application Ser. No. PCT/JP2021/027854 filed on Jul. 28, 2021 which designates the United States, incorporated herein by reference.

TECHNICAL FIELD

The present invention relates to a misfire detection apparatus and a misfire detection method for a multi-cylinder engine, configured to detect a misfiring state of the multi-cylinder engine.

BACKGROUND ART

As this type of technology, an apparatus configured to detect a misfiring state of a gas engine using city gas as fuel has been conventionally known (see, for example, Patent Literature 1). The apparatus described in Patent Literature 1 detects a rise in temperature due to an oxidation reaction of unburned gas by using the temperature of exhaust gas that has passed through a catalyst, and detects the misfiring state of the gas engine.

By purifying the exhaust gas from the engine with the catalyst, it becomes possible to reduce release of harmful chemical substances to the atmosphere and minimize adverse effects on human health and the environment.

CITATION LIST

Patent Literature

Patent Literature 1: Japanese Unexamined Patent Publication No. 2013-209951

SUMMARY OF INVENTION

Technical Problem

Incidentally, when the exhaust gas purification catalyst is exposed to high temperatures exceeding a normally used temperature range for a long time, the purification performance is degraded by sintering. Hence, there is a demand for detecting a misfire of the engine that may lead to a rise in catalyst temperature early. However, by simply monitoring the exhaust gas temperature like the apparatus described in Patent Literature 1, it is difficult to detect the misfiring state of the engine early.

Solution to Problem

An aspect of the present invention is a misfire detection apparatus for multi-cylinder engine. The apparatus is configured to detect a misfiring state in which any of a plurality of cylinders in an engine is misfiring. The engine includes: the plurality of cylinders; and a catalyst device configured to purify exhaust gas from the plurality of cylinders. The apparatus includes: a rotation sensor configured to detect a rotational speed of the engine; and an electronic control unit including a processor and a memory coupled to the processor and configured to control operation of the engine. The engine is a four-stroke V-type two-cylinder engine that makes two rotations per cycle. The processor determines whether the rotational speed of the engine instantaneously increases twice for every two rotations of the engine based on change characteristics of the rotational speed detected by the rotation sensor and detects the misfiring state of the engine based on a determination result in a startup period in which the rotational speed increases after cranking of the engine ends.

Another aspect of the present invention is a misfire detection method for multi-cylinder engine. The method is configured to detect a misfiring state in which any of a plurality of cylinders in an engine is misfiring. The engine includes: the plurality of cylinders; and a catalyst device configured to purify exhaust gas from the plurality of cylinders. The engine is a four-stroke V-type two-cylinder engine that makes two rotations per cycle. The method includes the steps of: determining whether a rotational speed of the engine instantaneously increases twice for every two rotations of the engine based on change characteristics of the rotational speed and detecting the misfiring state of the engine based on a determination result in a startup period in which the rotational speed increases after cranking of the engine ends.

Advantageous Effects of the Invention

According to the present invention, it becomes possible to detect the misfiring state of the engine early.

DESCRIPTION OF EMBODIMENT

Hereinafter, embodiments of the present invention will be described with reference to FIGS. 1A to 9. A misfire detection apparatus for a multi-cylinder engine according to an embodiment of the present invention is applied to an internal combustion engine including a plurality of cylinders. Hereinafter, in particular, an example to be applied to a spark ignition type of air-cooled four-stroke V-type two-cylinder engine that is widely used as a small-sized general engine will be described.

Figure 1A:
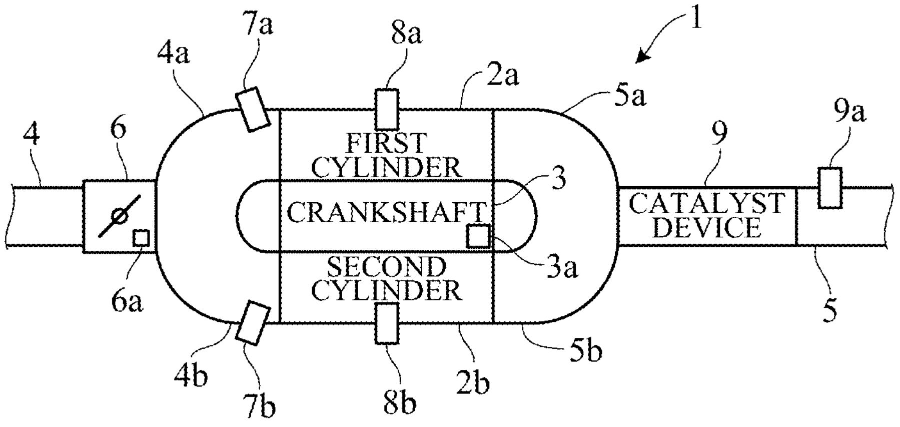
FIG. 1A is a diagram schematically illustrating an example of a configuration of an engine, to which a misfire detection apparatus for a multi-cylinder engine according to an embodiment of the present invention is applied.
Figure 1B:
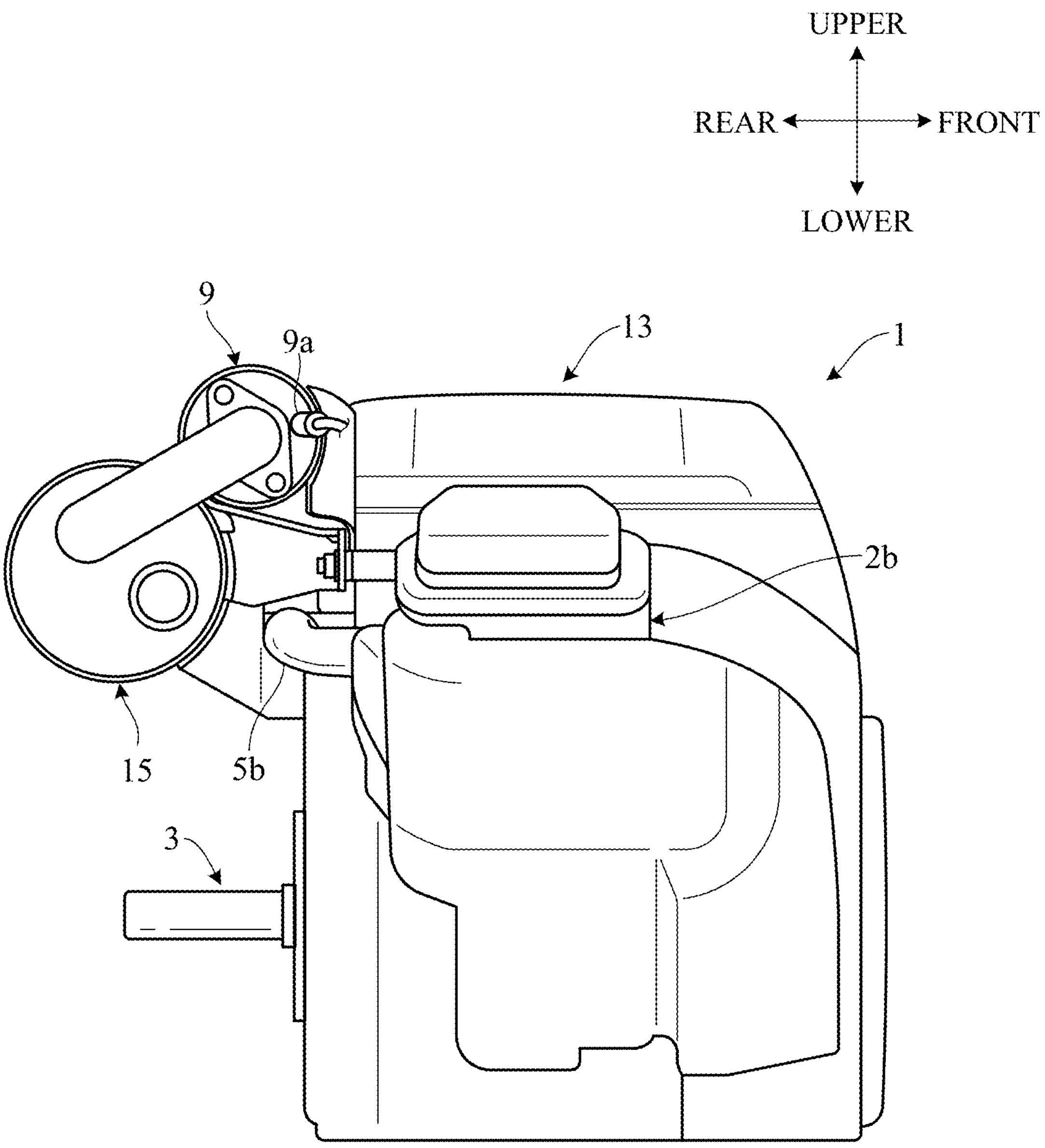
FIG. 1B is a side view of the engine of FIG. 1A.
Figure 1C:
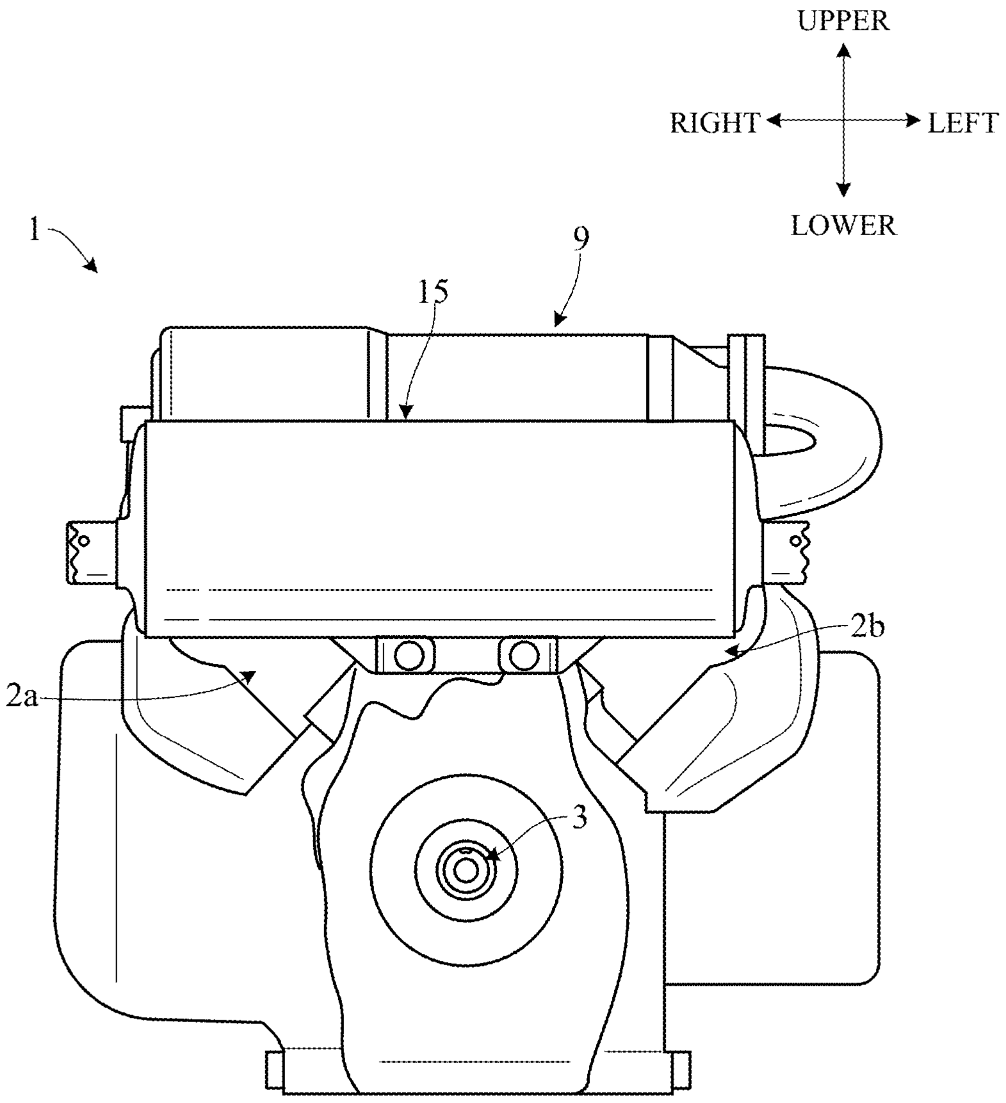
FIG. 1C is a rear view of the engine of FIG. 1A.

FIGS. 1A to 1C are diagrams schematically illustrating an example of a configuration of an engine 1, to which a misfire detection apparatus for a multi-cylinder engine according to the embodiment of the present invention is applied. As illustrated in FIGS. 1A to 1C, the engine 1 includes a first cylinder 2*a* and a second cylinder 2*b*. A piston, not illustrated, is slidably disposed in the inside of each of the cylinders 2*a* and 2*b*, and a combustion chamber is formed between an inner wall of each of the cylinders 2*a* and 2*b* and a piston crown surface.

The pistons of the cylinders 2*a* and 2*b* are coupled with a crankshaft 3, which is an output shaft of the engine 1, through connecting rods, not illustrated. The piston reciprocates along the inner wall of each of the cylinders 2*a* and 2*b*, the crankshaft 3 rotates, and the engine 1 (an output shaft) rotates, accordingly. The crankshaft 3 is provided with a rotation sensor 3*a* such as a pulser coil that outputs a pulse signal whenever the crankshaft 3 rotates by a predetermined angle θ (for example, 15 degrees). A rotational speed NE of the engine 1 can be calculated, based on the pulse signal from the rotation sensor 3*a*. The pulse signal from the rotation sensor 3*a* is input into an electronic control unit 10 (FIG. 2), which controls the operation of the engine 1.

Figure 2:
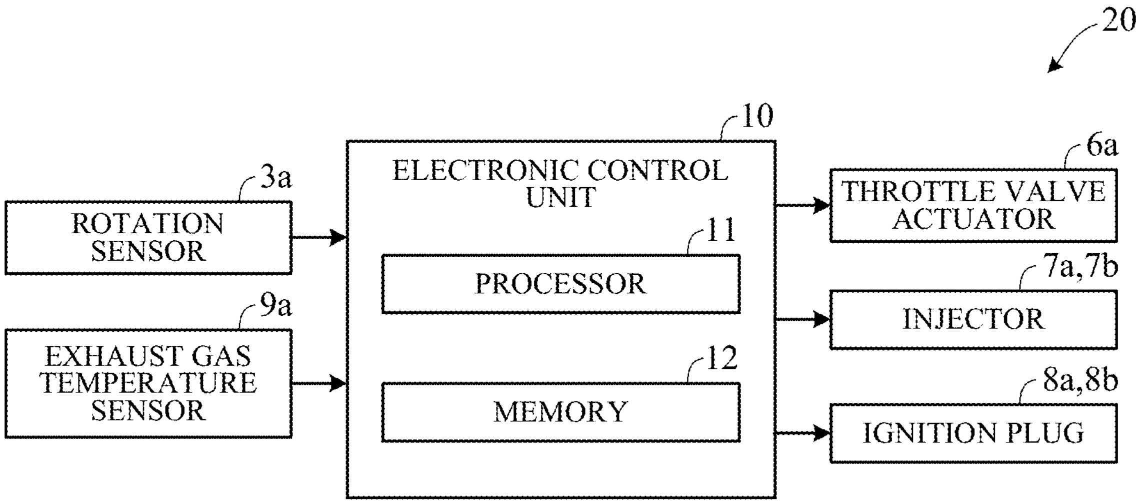
FIG. 2 is a block diagram schematically illustrating an example of a configuration of main components of the misfire detection apparatus for the multi-cylinder engine according to the embodiment of the present invention.

As illustrated in FIG. 1A, an intake passage 4, which introduces fresh air to be supplied to each of the cylinders 2*a* and 2*b*, branches into intake passages 4*a* and 4*b* respectively corresponding to the cylinders 2*a* and 2*b*. The intake passage 4 introduces the fresh air from the outside through an air cleaner 13 (FIG. 1B), which is disposed in an upper part of the engine 1 between the cylinders 2*a* and 2*b*. The intake passages 4*a* and 4*b* respectively communicate with the cylinders 2*a* and 2*b* via an intake port that is opened and closed by an intake valve, not illustrated, and exhaust passages 5*a* and 5*b* respectively corresponding to the cylinders 2*a* and 2*b* respectively communicate with the cylinders 2*a* and 2*b* via an exhaust port that is opened and closed by an exhaust valve, not illustrated. The operations of the intake valve and the exhaust valve are controlled by the electronic control unit 10 (FIG. 2).

A throttle valve 6 is interposed in the intake passage 4 on an upstream side of a branch point that branches into the intake passages 4*a* and 4*b*. The throttle valve 6 includes, for example, a butterfly valve, and a flow rate of the fresh air (the amount of the fresh air) supplied to each of the cylinders 2*a* and 2*b* is adjusted by the throttle valve 6. The throttle valve 6 is provided with a throttle valve actuator 6*a*, which adjusts an opening degree of the throttle valve 6. The operation of the throttle valve actuator 6*a* is controlled by the electronic control unit 10 (FIG. 2).

Injectors 7*a* and 7*b* are respectively provided in the intake passages 4*a* and 4*b* in the vicinity of the intake ports of the cylinders 2*a* and 2*b*. Each of the injectors 7*a* and 7*b* is driven by electric energy to open the valve, and injects fuel at a predetermined pressure supplied from the fuel tank via a fuel pump, not illustrated. Accordingly, the fuel is supplied to the combustion chamber of each of the cylinders 2*a* and 2*b* via the intake port. The cylinders 2*a* and 2*b* are respectively provided with ignition plugs 8*a* and 8*b* to face the combustion chamber. Each of the ignition plugs 8*a* and 8*b* generates sparks with electric energy, and ignites a mixture of the fresh air and the fuel in the combustion chamber of each of the cylinders 2*a* and 2*b*. The operations of the respective injectors 7*a* of 7*b* and the respective ignition plugs 8*a* and 8*b* are controlled by the electronic control unit 10 (FIG. 2).

As illustrated in FIGS. 1A to 1C, a catalyst device 9, which purifies the exhaust gas that has been discharged from each of the cylinders 2*a* and 2*b*, is interposed in an exhaust passage 5 on a downstream side of a merge point, into which the exhaust passages 5*a* and 5*b* merge, in a rear upper part of the engine 1. The exhaust that has been purified by the catalyst device 9 is discharged to the outside through a muffler 15. For the catalyst device 9, a noble metal catalyst such as a three-way catalyst that purifies the exhaust gas by oxidizing HC and CO contained in the exhaust gas and reducing NOx is used. Such a catalyst is carried on a carrier in a highly dispersed state in an impregnation method or the like in order to suppress the use amount of the noble metal while ensuring purification performance. However, if the catalyst is continuously exposed to high temperatures exceeding a normally used temperature range, a specific surface area and the number of active points are reduced by sintering, and the purification performance is irreversibly lowered.

When the engine 1 starts operating and high-temperature exhaust gas after combustion flows in from each of the cylinders 2*a* and 2*b*, the catalyst temperature of the catalyst device 9 rises, and sufficient purification performance is exhibited in a normally used temperature range of, for example, approximately 300° C. to 700° C. An exhaust gas temperature sensor 9*a*, which detects a temperature (exhaust temperature) Tex of the exhaust gas, is provided in the exhaust passage 5 on a downstream side of the catalyst device 9. A signal from the exhaust gas temperature sensor 9*a* is input into the electronic control unit 10 (FIG. 2).

In a state in which a part of the plurality of cylinders 2*a* and 2*b* is misfiring, by the way, if the operation of the entirety of the engine 1 is continued by continuous combustion in a remaining normal cylinder, a large amount of unburned gas that has passed through the misfiring cylinder will flow into the catalyst device 9. In this case, the oxidation reaction (exothermic reaction) of HC that has flowed in as the unburned gas may raise the catalyst temperature exceeding the normally used temperature range, and may impair the purification performance of the catalyst device 9.

For example, in a case where one of plug caps of the ignition plugs 8*a* and 8*b* is forgotten to be returned after maintenance of the engine 1, if the engine 1 is started up in a misfiring state in which one of the cylinders 2*a* and 2*b* is misfiring due to an ignition failure, and the operation is continued in such a state, the catalyst device 9 may be damaged. Hence, in the present embodiment, a misfire detection apparatus for a multi-cylinder engine is configured as follows so that the misfiring state of the engine 1 can be detected immediately after the startup, and the catalyst device 9 can be appropriately protected by promptly stopping the operation of the engine 1 as necessary.

FIG. 2 is a block diagram schematically illustrating an example of a configuration of main components of a misfire detection apparatus (hereinafter, an apparatus) 20 for a multi-cylinder engine according to the embodiment of the present invention. As illustrated in FIG. 2, the apparatus 20 mainly includes the electronic control unit 10. The electronic control unit 10 includes a computer including a processor 11 such as a CPU, a memory 12 such as a ROM and a RAM, and other peripheral circuits. The rotation sensor 3*a*, the exhaust gas temperature sensor 9*a*, the throttle valve actuator 6*a*, the injectors 7*a* and 7*b*, and the ignition plugs 8*a* and 8*b* are connected with the electronic control unit 10.

The processor 11 of the electronic control unit 10 detects a misfiring state of the engine 1 in which one of the cylinders 2*a* and 2*b* is misfiring, based on either the rotational speed NE of the engine 1 that has been detected by the rotation sensor 3*a* or an exhaust gas temperature Tex that has been detected by the exhaust gas temperature sensor 9*a*. Then, when the misfiring state of the engine 1 is detected, the operations of the throttle valve actuator 6*a*, the injectors 7*a* and 7*b*, and the ignition plugs 8*a* and 8*b* are controlled as necessary so that the engine 1 stops operating.

[Startup Mode Misfire Detection]

Figure 3A:
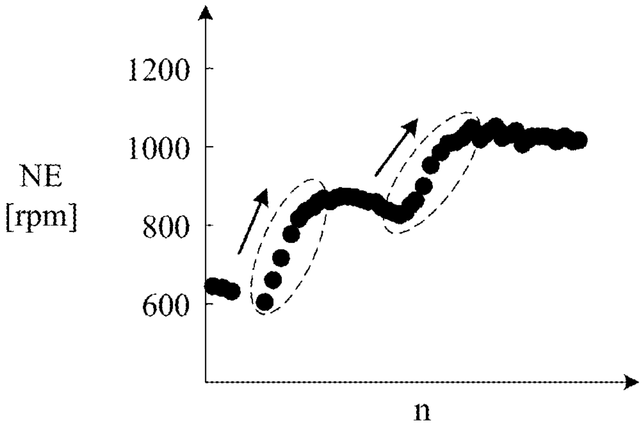
FIG. 3A is a diagram for describing change characteristics of a rotational speed during a startup period of the engine, in a case where normal combustion is performed in all cylinders of FIG. 1A.
Figure 3B:
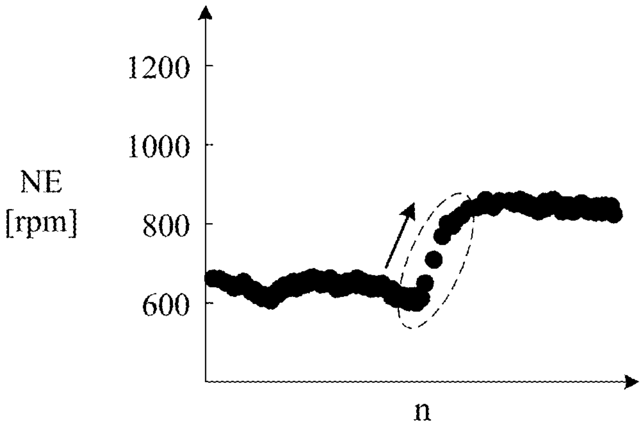
FIG. 3B is a diagram for describing change characteristics of the rotational speed during the startup period of the engine, in a case where one of the cylinders of FIG. 1A is misfiring.
Figure 3C:
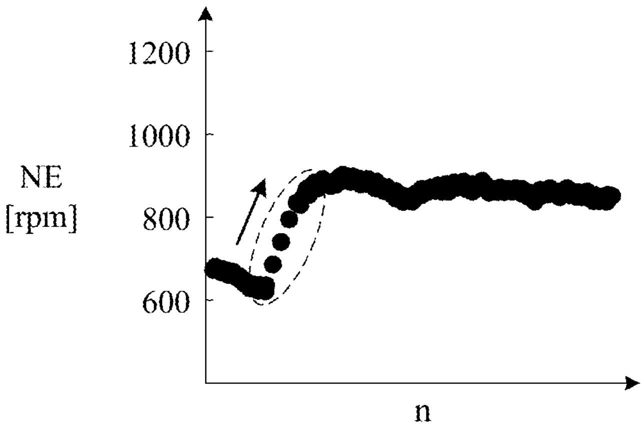
FIG. 3C is a diagram for describing change characteristics of the rotational speed during the startup period of the engine, in a case where the other of the cylinders of FIG. 1A is misfiring.

FIGS. 3A to 3C are diagrams for describing change characteristics of the rotational speed NE during a startup period of the engine 1, and illustrate an example of an instantaneous rotational speed NE of the engine 1 that is calculated whenever the n-th pulse signal is detected by the rotation sensor 3*a*, while the engine 1 is making two rotations. Referring to FIGS. 3A to 3C, a description will be given with regard to a case where the misfiring state of the engine 1 is detected, based on the instantaneous rotational speed NE of the engine 1 that is detected by the rotation sensor 3*a* during the startup period of the engine 1.

The pulse signal detected by the rotation sensor 3*a* is generated, whenever the crankshaft 3 rotates by a predetermined angle θ (for example, 15 degrees). Therefore, for example, an instantaneous angular velocity θ/ti [rad/s] of the crankshaft 3 can be calculated, based on a time interval ti between two pulses that have been consecutively detected by the rotation sensor 3*a*, and can be converted into the instantaneous rotational speed NE [rpm] of the engine 1.

The engine 1, which is a four-stroke engine, makes two rotations in one cycle of a combustion stroke including an intake stroke, a compression stroke, a combustion stroke, and an exhaust stroke. In addition, the engine 1, which is a V-type two-cylinder engine, experiences four top dead centers corresponding to compression top dead centers and exhaust top dead centers of the respective cylinders 2*a* and 2*b* while making two rotations in one cycle. In a case where normal combustion is performed in all the cylinders 2*a* and 2*b*, as illustrated in FIG. 3A, the instantaneous rotational speed NE of the engine 1 is increased in accordance with combustion start (ignition) in each of the cylinders 2*a* and 2*b*, for example, immediately before two compression top dead centers respectively corresponding to the ignition timings of the cylinders 2*a* and 2*b*.

For example, the instantaneous rotational speed NE is calculated four times for every two rotations of the engine 1, based on the time interval ti between the pulse signal corresponding to the top dead center of each of the cylinders 2*a* and 2*b* and the pulse signal immediately before it, and a previous value and a current value are compared with each other to determine whether the rotational speed NE has increased. As illustrated in FIG. 3A, in a case where the instantaneous rotational speed NE increases twice for every two rotations of the engine 1, it can be determined that normal combustion is performed in all the cylinders 2*a* and 2*b*.

On the other hand, as illustrated in FIGS. 3B and 3C, in a case where the instantaneous rotational speed NE increases only once for every two rotations of the engine 1, it is determined that the engine is in a misfiring state in which one of the cylinders 2*a* and 2*b* is misfiring. In addition, the cylinder 2*a* or 2*b* corresponding to the pulse signal in which the instantaneous increase in the rotational speed NE of the engine 1 is observed can be estimated to be a normal cylinder in which the normal combustion is performed, and the cylinder 2*a* or 2*b* in which the increase in the rotational speed NE is not observed can be estimated to be a misfiring cylinder.

The detection of the misfiring state based on such an instantaneous rotational speed NE of the engine 1 is performed during the startup period of the engine 1. That is, cranking of the engine 1 by a cell motor, a recoil starter, or the like ends, and when the rotational speed NE starts increasing exceeding a predetermined speed NE0 corresponding to rotation in complete engine startup, the detection is started, and is performed during the startup period until the rotational speed NE converges into a predetermined speed NE1 corresponding to idle rotation.

During such a startup period, the rotation of the engine 1 is unstable, and the change characteristic (fluctuation pattern) of the rotational speed NE changes depending on a startup condition such as an outside air temperature, outside air pressure, and a temperature state of the engine 1. For this reason, when the misfiring state is detected, based on the change characteristics of the rotational speed NE during the startup period of the engine 1, the misfiring state may be erroneously detected, or a normal cylinder and a misfiring cylinder may be erroneously estimated.

The processor 11 of the electronic control unit 10 continuously determines the presence or absence of the misfiring state for every two rotations of the engine 1 during the startup period, and detects the misfiring state of the engine 1, when determining the misfiring state a predetermined number of times (for example, once) or more during the startup period. This enables detection of the misfiring state of the engine 1 with certainty. Such a predetermined number of times may be two or more, and may be changed depending on a startup condition. In this case, erroneous detection of the misfiring state can be suppressed as necessary.

[Startup Mode Stop Operation]

When the misfiring state of the engine 1 is detected, the processor 11 of the electronic control unit 10 controls the operations of the injectors 7*a* and 7*b* and the ignition plugs 8*a* and 8*b* so as to stop fuel supply to and ignition of one of the cylinders 2*a* and 2*b*, which has been estimated to be a normal cylinder. In a case where misfire detection and estimations of the normal cylinder and the misfiring cylinder are correct, the fuel supply to and the ignition of the normal cylinder are stopped. Then, combustion is stopped in all the cylinders 2*a* and 2*b*, the entirety of the engine 1 is stopped, and the catalyst device 9 is protected.

On the other hand, in a case where the misfire detection or the estimations of the normal cylinder and misfiring cylinder is wrong, the combustion continues in the normal cylinder to which the fuel supply or the ignition is not stopped, the entirety of the engine 1 is continuously operating, and the rotational speed NE of the engine 1 is maintained at the predetermined speed NE1 corresponding to the idle rotation. In this case, the convenience of the user is not impaired by stopping of the operation of the engine 1 due to the erroneous detection.

In a case where the misfire detection or the estimations of the normal cylinder and the misfiring cylinder is wrong, the processor 11 of the electronic control unit 10 controls the operations of the injectors 7*a* and 7*b* and the ignition plugs 8*a* and 8*b* so as to restart the fuel supply to and the ignition of the cylinders 2*a* and 2*b*, which have been estimated to be normal cylinders. In addition, the operations of the injectors 7*a* and 7*b* and the ignition plugs 8*a* and 8*b* are controlled to stop the fuel supply to and the ignition of the other one of the cylinders 2*a* and 2*b* that has been estimated to be the misfiring cylinder.

In a case where the misfire detection itself is correct, the fuel supply to and the ignition of a normal cylinder that has been erroneously estimated to be the misfiring cylinder are stopped. Thus, the combustion is stopped in all the cylinders 2*a* and 2*b*, the entirety of the engine 1 is stopped, and the catalyst device 9 is protected. On the other hand, in a case where the misfire detection itself is wrong, the combustion continues in the normal cylinder to which the fuel supply and the ignition have been restarted. Thus, the entirety of the engine 1 is continuously operating. In this case, the convenience of the user is not impaired by stopping of the operation of the engine 1 due to the erroneous detection.

Until the engine 1 in a normal temperature state that is not in a high temperature state such as immediately after a previous operation starts operating, and the catalyst temperature of the catalyst device 9 reaches the normally used temperature range, a certain period of time (for example, about several tens of minutes) is usually needed (a catalyst warming-up period). During such a catalyst warming-up period, even though the engine 1 is continuously operating in the misfiring state, the catalyst temperature is low, and the oxidation reaction hardly proceeds also after the unburned gas flows into the catalyst device 9. Hence, it is difficult to detect the misfiring state of the engine 1, based on the exhaust gas temperature Tex. Regardless of the exhaust gas temperature Tex, the detection based on the rotational speed NE enables detection of the misfiring state of the engine 1 early also during the startup period, and enables protection of the catalyst device 9 appropriately.

In addition, when the misfiring state of the engine 1 is detected, a stop operation for stopping the combustion is sequentially performed for each of the plurality of cylinders 2*a* and 2*b*. Thus, the engine 1 is capable of continuously operating, even in a case where the misfiring state is erroneously detected. Therefore, the convenience of the user is not impaired by stopping of the operation of the engine 1 due to the erroneous detection.

[Normal Mode Misfire Detection]

Figure 4:
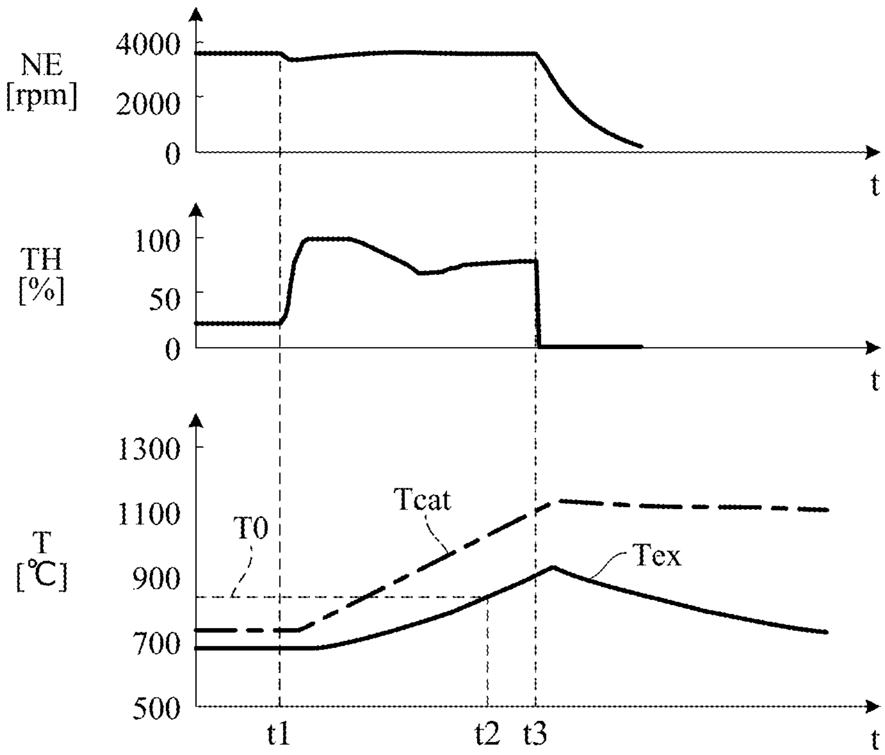
FIG. 4 is a time chart for describing change characteristics of an exhaust gas temperature, in a case where a misfire occurs in one of the cylinders, while the engine of FIG. 1A is operating normally.

FIG. 4 is a time chart for describing the change characteristics of the exhaust gas temperature Tex, in a case where a misfire occurs in one of the cylinders 2*a* and 2*b*, while the engine 1 is operating normally. Referring to FIG. 4, a description will be given with regard to a case where the misfiring state of the engine 1 is detected, based on the exhaust gas temperature Tex, which is detected by the exhaust gas temperature sensor 9*a*, while the engine 1 is operating normally.

As illustrated in FIG. 4, in a case where one of the cylinders 2*a* and 2*b* misfires (time t1) and the engine 1 is continuously operating in the misfiring state, a catalyst temperature Tcat rises due to the oxidation reaction of the unburned gas that has passed through the misfiring cylinder and flows into the catalyst device 9 (time t1 to time t3). In this situation, as the catalyst temperature Tcat rises, the exhaust gas temperature Tex after passing through the catalyst device 9 also rises.

After the startup period of the engine 1 elapses, while the engine 1 is operating normally, the processor 11 of the electronic control unit 10 detects a misfiring state of the engine 1, when a state in which the exhaust gas temperature Tex of the engine 1 that has been detected by the exhaust gas temperature sensor 9*a* exceeds a threshold T0 continues for a predetermined time period (time t2 to time t3). Alternatively, when a rising speed ΔTex of the exhaust gas temperature Tex exceeds a threshold ΔT0, the processor 11 of the electronic control unit 10 detects the misfiring state of the engine 1. By monitoring a rise in the exhaust gas temperature Tex corresponding to a rise in the catalyst temperature Tcat due to the oxidation reaction of the unburned gas, it becomes possible to detect the misfiring state of the engine 1, in a case where there is a high probability that one of the cylinders 2*a* and 2*b* is misfiring.

[Normal Mode Stop Operation]

Figure 5A:
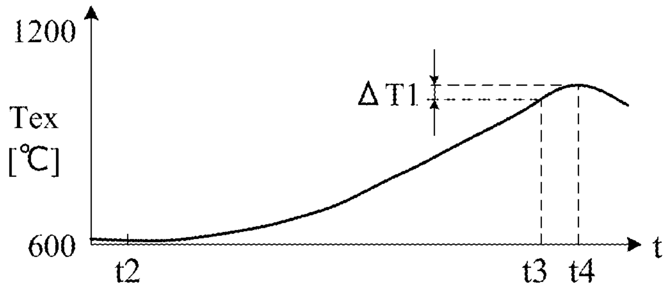
FIG. 5A is a time chart for describing change characteristics of the exhaust gas temperature after engine operation is stopped, in a case where a throttle valve is fully closed when the engine is stopped in FIG. 4.
Figure 5B:
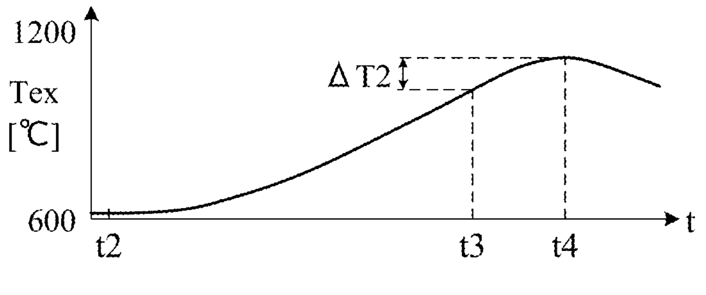
FIG. 5B is a time chart for describing change characteristics of the exhaust gas temperature after engine operation is stopped, in a case where the throttle valve is fully opened when the engine is stopped in FIG. 4.

When detecting the misfiring state of the engine 1, based on the exhaust gas temperature Tex, the processor 11 controls the operations of the throttle valve actuator 6*a*, the injectors 7*a* and 7*b*, and the ignition plugs 8*a* and 8*b* so as to stop the engine 1 (time t3). FIGS. 5A and 5B are time charts for describing the change characteristics of the exhaust gas temperature Tex after the operation of the engine 1 is stopped. FIG. 5A illustrates a temperature change in a case where the throttle valve 6 is fully closed, and FIG. 5B illustrates a temperature change in a case where the throttle valve 6 is fully opened.

When the misfiring state of the engine 1 is detected, based on the exhaust gas temperature Tex, the operations of the injectors 7*a* and 7*b* and the ignition plugs 8*a* and 8*b* are controlled to stop the fuel supply to and the ignition of the cylinders 2*a* and 2*b*. Accordingly, the operation of the engine 1 is immediately stopped (time t3). In this situation, as illustrated in FIGS. 4 and 5A, the throttle valve 6 is further fully closed to immediately stop the supply of the fresh air, so that the oxidation reaction of the unburned gas can be promptly stopped, and a rise in the catalyst temperature after the engine 1 stops operating can be minimized. That is, as illustrated in FIG. 5B, a rise in catalyst temperature after the engine 1 stops operating can be suppressed, as compared with a case where the engine 1 stops operating by fully opening the throttle valve 6 (rises in the exhaust gas temperature Tex: $\Delta T1 < \Delta T2$).

Figure 6:
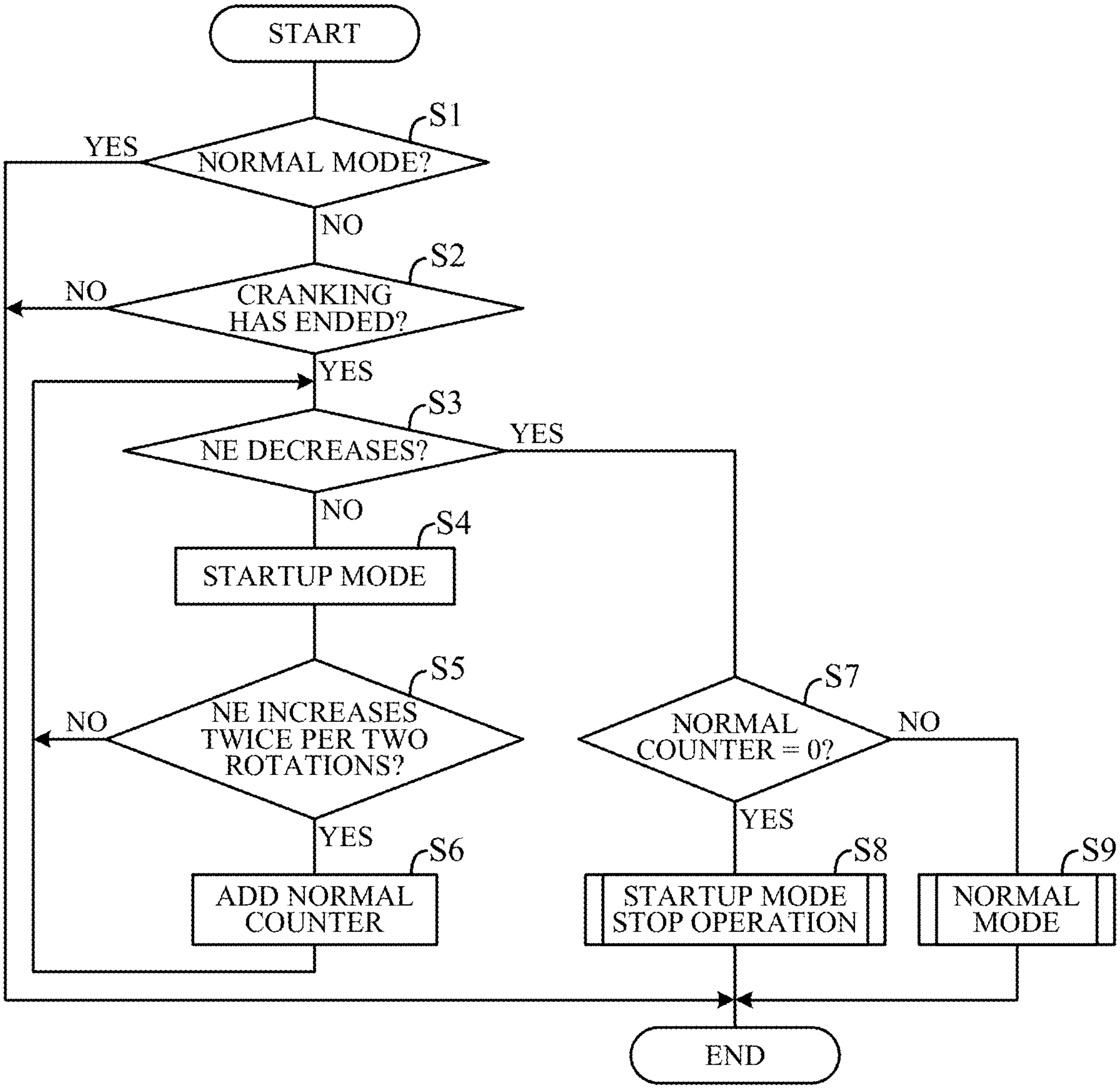
FIG. 6 is a flowchart illustrating an example of misfire detection processing at the time of startup performed by the misfire detection apparatus for the multi-cylinder engine according to the embodiment of the present invention.
Figure 7:
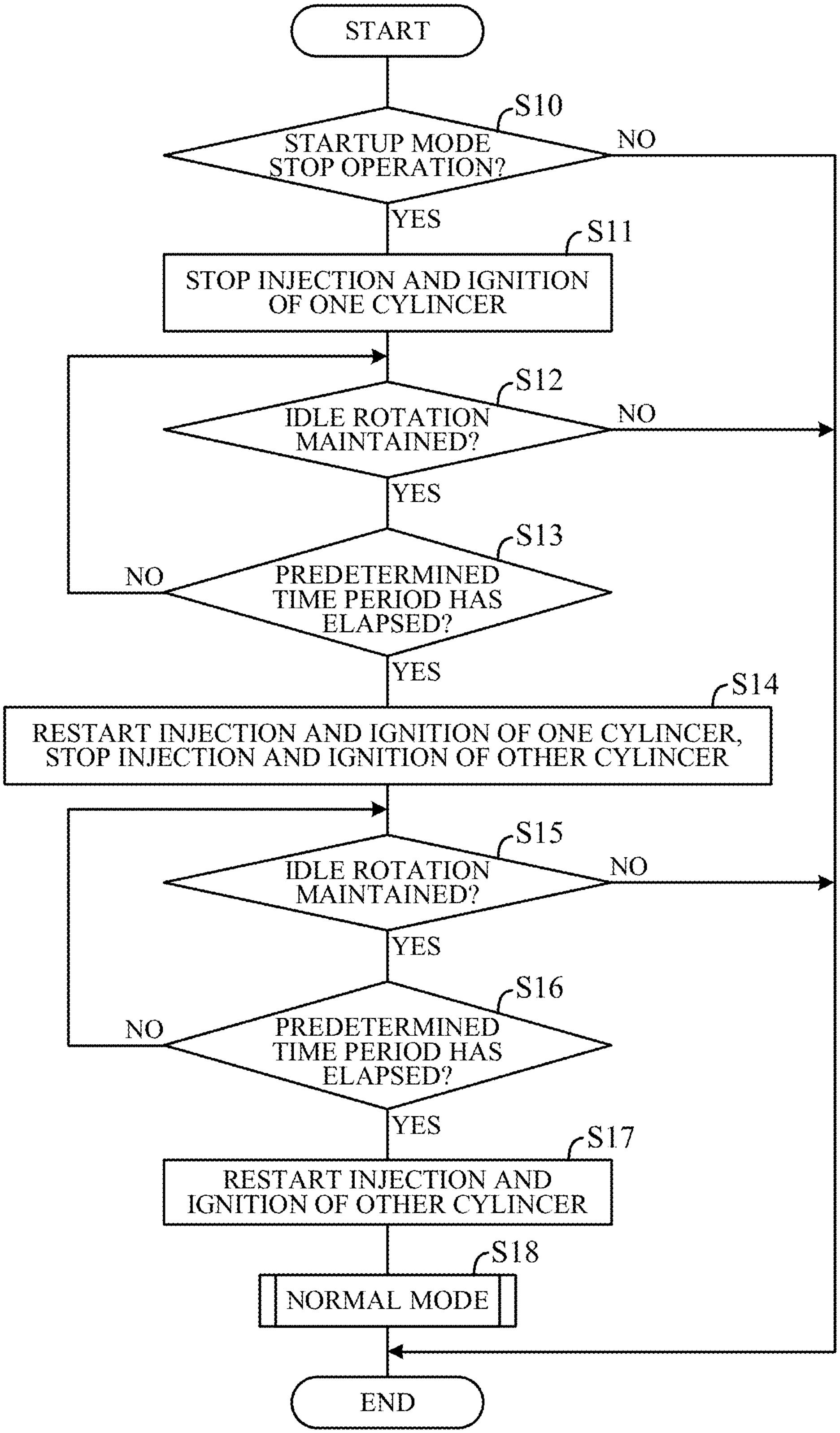
FIG. 7 is a flowchart illustrating an example of combustion stop processing at the time of startup performed by the misfire detection apparatus for the multi-cylinder engine according to the embodiment of the present invention.
Figure 8A:
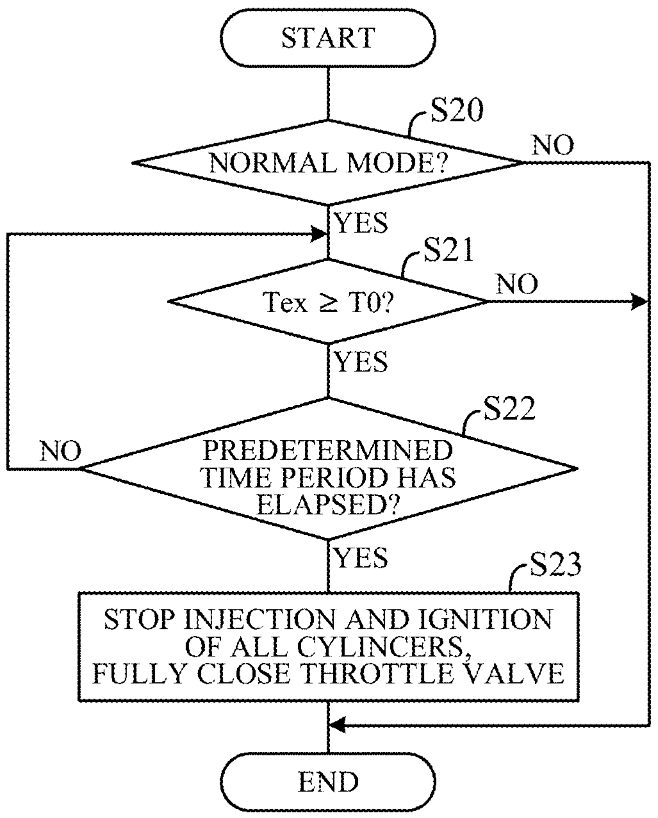
FIG. 8A is a flowchart illustrating an example of misfire detection processing in a normal operation performed by the misfire detection apparatus for the multi-cylinder engine according to the embodiment of the present invention.
Figure 8B:
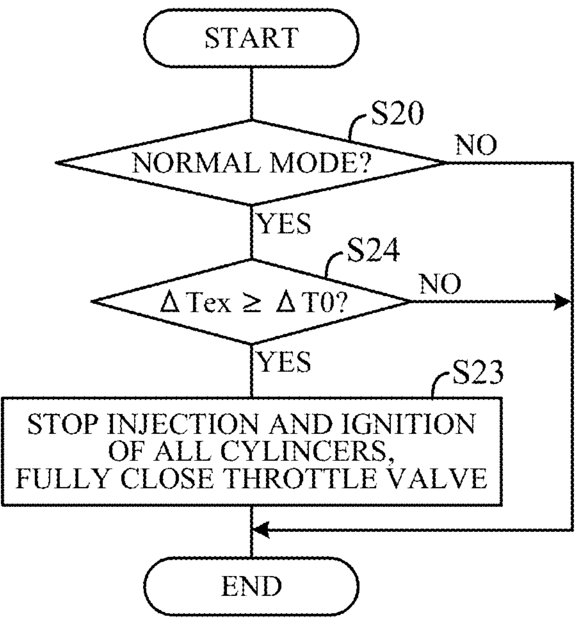
FIG. 8B is a flowchart illustrating another example of misfire detection processing in a normal operation performed by the misfire detection apparatus for the multi-cylinder engine according to the embodiment of the present invention.

FIGS. 6 to 8B are flowcharts illustrating examples of processing performed by the processor 11 of the electronic control unit 10. FIG. 6 illustrates misfire detection processing at the time of startup, FIG. 7 illustrates combustion stop processing at the time of startup, and FIGS. 8A and 8B illustrate misfire detection processing in a normal operation. When the electronic control unit 10 is activated, the processing of FIGS. 6 to 8B is started, and is repeated at a predetermined cycle. For example, the processing is repeated every cycle of the engine 1.

In the misfire detection processing at the time of startup as illustrated in FIG. 6, first, in step S1, it is determined whether the engine 1 is operating normally after the startup period. In a case where a positive determination is made in step S1, the processing ends. In a case where a negative determination is made in step S1, the processing proceeds to step S2. In step S2, it is determined whether cranking of the engine 1 has ended and the rotational speed NE has exceeded the predetermined speed NE0 corresponding to the rotation in complete engine startup. In a case where a negative determination is made in step S2, it is determined that the engine 1 is cranking, and the processing ends. In a case where a positive determination is made in step S2, the processing proceeds to step S3. In step S3, it is determined whether the rotational speed NE decreases and starts converging into the predetermined speed NE1 corresponding to idle rotation.

In a case where a negative determination is made in step S3, it is determined that the startup period is in progress, and the processing proceeds to steps S4 to S6. In step S4, a misfire detection mode is switched to a startup mode of detecting the misfiring state, based on the instantaneous rotational speed NE in the startup period. Next, in step S5, it is determined whether the instantaneous rotational speed NE increases twice per two rotations corresponding to one cycle of the engine 1. In a case where a positive determination is made in step S5, "+1" is added to a normal counter in step S6, and the processing returns to step S3. In a case where a negative determination is made in step S5, no addition is given to the normal counter, and the processing returns to step S3.

In a case where a positive determination is made in step S3, it is determined that the startup period has ended, and the processing proceeds to steps S7 to S9. In step S7, it is determined whether the normal counter is "0". In a case where a positive determination is made in step S7, it is determined that the engine 1 is in the misfiring state, the processing proceeds to step S8, and a stop operation of the startup mode (FIG. 7) is instructed. In a case where a negative determination is made in step S7, it is determined that the engine 1 is not in the misfiring state, the processing proceeds to step S9, and the misfire detection mode is switched to a normal mode of detecting the misfiring state, based on the exhaust gas temperature Tex in the normal operation of the engine 1 (FIGS. 8A and 8B).

In the combustion stop processing at the time of startup as illustrated in FIG. 7, first, in step S10, it is determined whether the stop operation of the startup mode has been instructed. In a case where a negative determination is made in step S10, the processing ends. In a case where a positive determination is made in step S10, the processing proceeds to step S11. In step S11, the operations of the injectors 7*a* and 7*b* and the ignition plugs 8*a* and 8*b* are controlled to stop the fuel supply to and the ignition of one of the cylinders 2*a* and 2*b* that has been estimated to be a normal cylinder. Next, in step S12, it is determined whether the rotational speed NE is maintained at the predetermined speed NE1 corresponding to the idle rotation. In a case where a negative determination is made in step S12, the processing ends. In this case, the rotational speed NE decreases, and the operation of the engine 1 stops.

In a case where a positive determination is made in step S12, the processing proceeds to step S13. In step S13, it is determined whether a predetermined time period has elapsed while the rotational speed NE is maintained at the predetermined speed NE1 corresponding to the idle rotation. In a case where a negative determination is made in step S13, the processing returns to step S12. In a case where a positive determination is made in step S13, it is determined that either the misfire detection or the estimations of the normal cylinder and misfiring cylinder is wrong, and the processing proceeds to step S14.

In step S14, the operations of the injectors 7*a* and 7*b* and the ignition plugs 8*a* and 8*b* are controlled to restart the fuel supply to and the ignition of one of the cylinders 2*a* and 2*b* that has been estimated to be the normal cylinder. In addition, the operations of the injectors 7*a* and 7*b* and the ignition plugs 8*a* and 8*b* are controlled to stop the fuel supply to and the ignition of the other one of the cylinders 2*a* and 2*b* that has been estimated to be the misfiring cylinder.

Next, in step S15, it is determined whether the rotational speed NE is maintained at the predetermined speed NE1 corresponding to the idle rotation. In a case where a negative determination is made in step S15, the processing ends. In this case, the rotational speed NE decreases, and the operation of the engine 1 stops. In a case where a positive determination is made in step S15, the processing proceeds to step S16. In step S16, it is determined whether a predetermined time period has elapsed, while the rotational speed NE is maintained at the predetermined speed NE1 corresponding to the idle rotation. In a case where a negative determination is made in step S16, the processing returns to step S15. In a case where a positive determination is made in step S16, it is determined that the misfire detection itself is wrong, and the processing proceeds to step S17.

In step S17, the operations of the injectors 7*a* and 7*b* and the ignition plugs 8*a* and 8*b* are controlled to restart the fuel supply to and the ignition of the other one of the cylinders 2*a* and 2*b* that has been estimated to be the misfiring cylinder. Next, in step S18, the misfire detection mode is switched to the normal mode of detecting the misfiring state, based on the exhaust gas temperature Tex, while the engine 1 is operating normally (FIGS. 8A and 8B).

In the misfire detection processing in the normal operation as illustrated in FIG. 8A, first, in step S20, it is determined whether the engine 1 is operating normally after the startup period. In a case where a negative determination is made in step S20, the processing ends. In a case where a positive determination is made in step S20, the processing proceeds to step S21. In step S21, it is determined whether the exhaust gas temperature Tex exceeds the threshold T0. In a case where a negative determination is made in step S21, the processing ends. In a case where a positive determination is made in step S21, the processing proceeds to step S22. In step S22, it is determined whether a predetermined time period has elapsed with the exhaust gas temperature Tex exceeding the threshold T0. In a case where a negative determination is made in step S22, the processing returns to step S21. In a case where a positive determination is made in step S22, it is determined that the engine 1 is in the misfiring state, and the processing proceeds to step S23. In step S23, the operations of the injectors 7*a* and 7*b* and the ignition plugs 8*a* and 8*b* are controlled to stop the fuel supply to and the ignition of the cylinders 2*a* and 2*b* and immediately stop the operation of the engine 1. In addition, the operation of the throttle valve actuator 6*a* is controlled to fully close the throttle valve 6 and immediately stop the supply of the fresh air.

In the misfire detection processing in the normal operation as illustrated in FIG. 8B, first, in step S20, it is determined whether the engine 1 is operating normally after the startup period. In a case where a negative determination is made in step S20, the processing ends. In a case where a positive determination is made in step S20, the processing proceeds to step S24. In step S24, it is determined whether the rising speed ΔTex of the exhaust gas temperature Tex exceeds the threshold ΔT0. In a case where a negative determination is made in step S24, the processing ends. In a case where a positive determination is made in step S24, it is determined that the engine 1 is in the misfiring state, and the processing proceeds to step S23. In step S23, the operations of the injectors 7*a* and 7*b* and the ignition plugs 8*a* and 8*b* are controlled to stop the fuel supply to and the ignition of the cylinders 2*a* and 2*b* and immediately stop the operation of the engine 1. In addition, the operation of the throttle valve actuator 6*a* is controlled to fully close the throttle valve 6 and immediately stop the supply of the fresh air.

Figure 9:
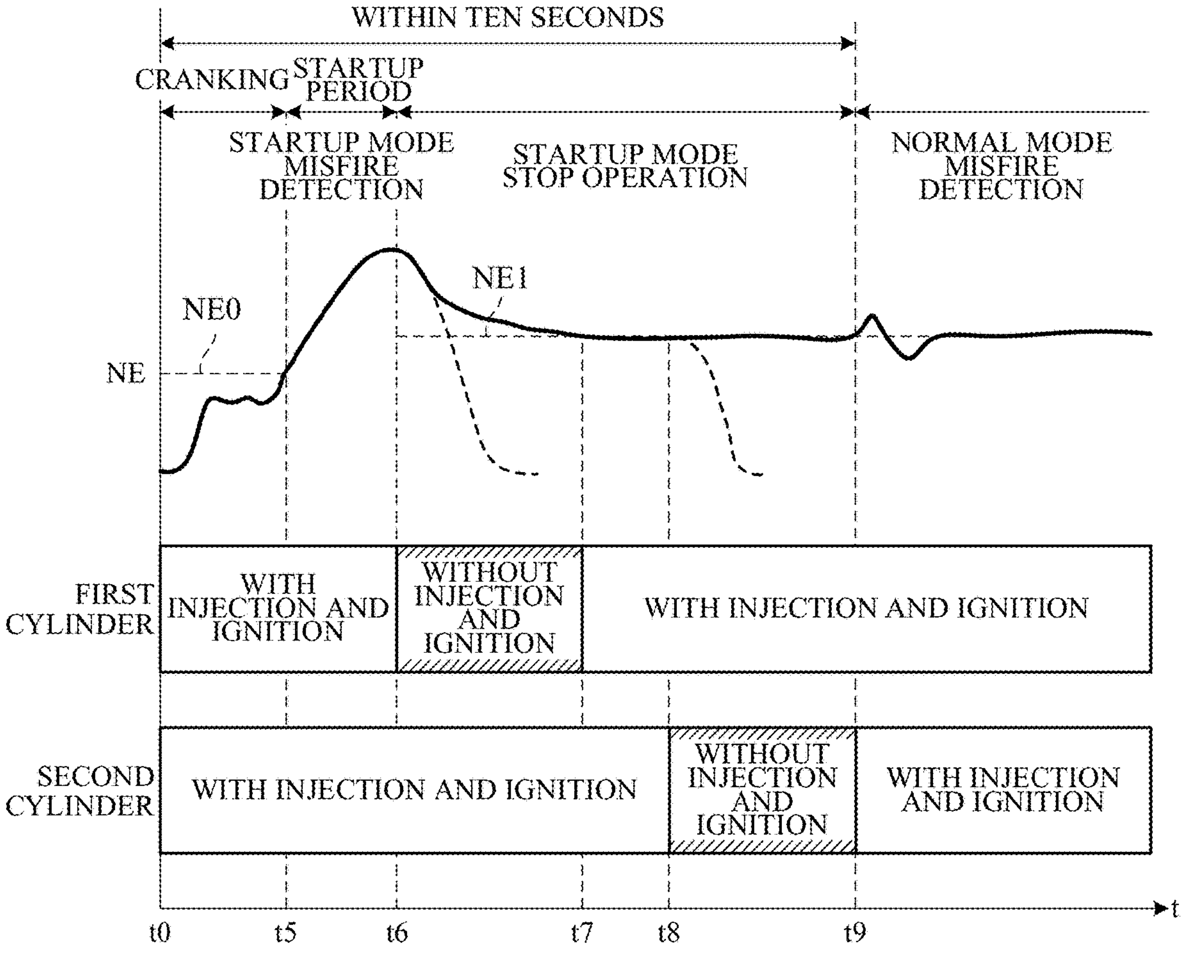
FIG. 9 is a time chart illustrating an example of an operation by the misfire detection apparatus for the multi-cylinder engine according to the embodiment of the present invention.

FIG. 9 is a time chart illustrating an example of an operation by the misfire detection apparatus for the multi-cylinder engine according to the embodiment of the present invention. As illustrated in FIG. 9, cranking of the engine 1 is started at time t0, and when the rotational speed NE exceeds the predetermined speed NE0 corresponding to rotation in complete engine startup at time t5, the misfire detection in the startup mode is started (step S1 to step S6 in FIG. 6). In the startup mode, the misfiring state of the engine 1 is detected, based on the rotational speed NE, regardless of the exhaust gas temperature Tex. Therefore, the misfiring state of the engine 1 can be detected immediately after the cranking ends.

When the misfiring state of the engine 1 is detected in the startup period while the rotational speed NE decreases at time t6 and before it starts to converge into the predetermined speed NE1 corresponding to the idle rotation, the stop operation of the startup mode is started at time t6 (steps S3, S7, and S8 in FIG. 6). When the stop operation of the startup mode is started at time t6, first, the fuel supply to and the ignition of the first cylinder 2*a*, which has been estimated to be the normal cylinder, are stopped (steps S10 and S11 in FIG. 7). In a case where the misfire detection and the estimations of the normal cylinder and the misfiring cylinder are correct, the rotational speed NE decreases as indicated by a broken line, and the catalyst device 9 is protected by stopping the engine 1 ("NO" in step S12 in FIG. 7). On the other hand, in a case where either the misfire detection or the estimations of the normal cylinder and the misfiring cylinder is wrong, the rotational speed NE is maintained at the predetermined speed NE1 corresponding to the idle rotation ("YES" in steps S12 and S13 in FIG. 7). When a predetermined time period elapses while the rotational speed NE is maintained at the predetermined speed NE1 corresponding to the idle rotation at time t7, the fuel supply to and the ignition of the first cylinder 2*a* are restarted (step S14 in FIG. 7).

Next, at time t8, the fuel supply to and the ignition of the second cylinder 2*b*, which has been estimated to be the misfiring cylinder, are stopped (step S14 in FIG. 7). In a case where the misfire detection itself is correct, the rotational speed NE decreases as indicated by a broken line, and the catalyst device 9 is protected by stopping the engine 1 ("NO" in step S15 in FIG. 7). On the other hand, in a case where the misfire detection itself is wrong, the rotational speed NE is maintained at the predetermined speed NE1 corresponding to the idle rotation ("YES" in steps S15 and S16 in FIG. 7). When a predetermined time period elapses while the rotational speed NE is maintained at the predetermined speed NE1 corresponding to the idle rotation at time t9, the fuel supply to and the ignition of the second cylinder 2*b* are restarted (step S17 in FIG. 7).

In the startup mode, when the misfiring state of the engine 1 is detected in the startup period from time t5 to time t6, the stop operation of sequentially stopping the combustion is performed for each of the cylinders 2*a* and 2*b* from time t6 to time t9. Thus, the engine 1 is capable of continuously operating, even in a case where the misfiring state is erroneously detected. Therefore, the convenience of the user is not impaired by stopping of the operation of the engine 1 due to the erroneous detection. In addition, such a startup mode is performed in a short period of time, for example, within ten seconds from the start of the cranking of the engine 1. Therefore, the convenience of the user is not impaired.

According to the present embodiment, the following operations and effects are achievable.

(1) The apparatus 20 detects the misfiring state in which any of the plurality of cylinders 2*a* and 2*b* in the engine 1 is misfiring, the engine 1 including: the plurality of cylinders 2*a* and 2*b*; and the catalyst device 9, which purifies the exhaust gas from the plurality of cylinders 2*a* and 2*b* (FIG. 1A to FIG. 1C). The apparatus 20 includes: the rotation sensor 3*a*, which detects the rotational speed NE of the engine 1; and the electronic control unit 10 including the processor 11, and the memory 12 connected with the processor 11, in which the electronic control unit 10 is configured to control the operation of the engine 1 (FIG. 1A and FIG. 2). The processor 11 detects the misfiring state of the engine 1, based on the rotational speed NE of the engine 1 that has been detected by the rotation sensor 3*a* (FIG. 3A to FIG. 3C and FIG. 6). The detection based on the rotational speed NE of the engine 1 enables detection of the misfiring state of the engine 1 immediately after cranking with a simple configuration.

(2) The apparatus 20 further includes the exhaust gas temperature sensor 9*a*, which detects the exhaust gas temperature Tex of the engine 1 (FIG. 1A, FIG. 1B, and FIG. 2). The processor 11 detects the misfiring state of the engine 1, based on either the rotational speed NE of the engine 1 that has been detected by the rotation sensor 3*a* or the exhaust gas temperature Tex that has been detected by the exhaust gas temperature sensor 9*a* (FIG. 3A to FIG. 4, FIG. 6, FIG. 8A, and FIG. 8B). In a case where the misfiring state of the engine 1 is detected, based on the rotational speed NE of the engine 1, the misfiring state of the engine 1 can be detected earlier, and in a case where the misfiring state of the engine 1 is detected, based on the exhaust gas temperature Tex, the misfiring state of the engine 1 can be detected with more certainty.

(3) The exhaust gas temperature sensor 9*a* detects the exhaust gas temperature Tex after passing through the catalyst device 9 (FIG. 1A and FIG. 1B). In a case where the engine 1 is continuously operating in a state in which one of the cylinders 2*a* and 2*b* is misfiring, the catalyst temperature rises due to the oxidation reaction of the unburned gas that has passed through the misfiring cylinder and flows into the catalyst device 9. The exhaust gas temperature Tex after passing through the catalyst device 9 is detected, so that a rise in the catalyst temperature due to the oxidation reaction of the unburned gas can be detected, and the misfiring state of the engine 1 can be detected, in a case where there is a high probability that one of the cylinders 2*a* and 2*b* is misfiring.

(4) The engine 1 includes the throttle valve 6, which adjusts the amount of fresh air to be supplied to the plurality of cylinders 2*a* and 2*b* (FIG. 1A). The processor 11 detects the misfiring state of the engine 1, based on the exhaust gas temperature Tex that has been detected by the exhaust gas temperature sensor 9*a*, after the cranking of the engine 1 ends and after the startup period in which the rotational speed NE of the engine 1 increases elapses (FIG. 4, FIG. 6, FIG. 8A, and FIG. 8B). When the misfiring state of the engine 1 is detected, based on the exhaust gas temperature Tex that has been detected by the exhaust gas temperature sensor 9*a*, the processor 11 controls the operation of the throttle valve 6 to stop the engine 1 (FIG. 4 and FIG. 5A).

In a case where the misfiring state of the engine 1 is detected, based on the exhaust gas temperature Tex, and in a case where there is a high probability that one of the cylinders 2*a* and 2*b* is misfiring, the operation of the engine 1 is immediately stopped, so that the damage of the catalyst device 9 can be prevented. In addition, the throttle valve 6 is closed to immediately stop the supply of the fresh air, so that the oxidation reaction of the unburned gas can be promptly stopped and a rise in the catalyst temperature can be minimized.

(5) After the startup period elapses, when a state in which the exhaust gas temperature Tex that has been detected by the exhaust gas temperature sensor 9*a* exceeds the threshold T0 continues for a predetermined time period, the processor 11 detects the misfiring state of the engine 1 (FIG. 8A). This enables detection of the misfiring state of the engine 1 with accuracy.

(6) After the startup period elapses, when the rising speed ΔTex of the exhaust gas temperature Tex that has been detected by the exhaust gas temperature sensor 9*a* exceeds the threshold ΔT0, the processor 11 detects the misfiring state of the engine 1 (FIG. 8B). This enables detection of the misfiring state of the engine 1 with accuracy.

(7) After cranking of the engine 1 ends, in the startup period while the rotational speed NE of the engine 1 increases, the processor 11 detects the misfiring state of the engine 1, based on the rotational speed NE of the engine 1 that has been detected by the rotation sensor 3*a* (FIG. 3A to FIG. 3C and FIG. 6). In the startup period of the normal engine 1 such as a startup from a normal temperature state, the catalyst temperature is lower than the normally used temperature range, and the oxidation reaction hardly proceeds even though the unburned gas flows into the catalyst device 9. Hence, it is difficult to detect the misfiring state of the engine 1, based on the exhaust gas temperature Tex. By performing the detection based on the rotational speed NE, regardless of the exhaust gas temperature Tex, the misfiring state of the engine 1 can be detected also in such a startup period.

(8) The engine 1 is a four-stroke engine that makes two rotations per cycle. The processor 11 detects the misfiring state of the engine 1, based on the change characteristics of the rotational speed NE of the engine 1 that has been detected by the rotation sensor 3*a* every two rotations of the engine 1 (FIG. 3A to FIG. 3C and FIG. 6). By determining whether the rotational speed NE of the engine 1 increases twice corresponding to the number of cylinders per two rotations corresponding to one cycle of the engine 1, it becomes possible to determine whether the normal combustion is performed in all the cylinders 2*a* and 2*b* or whether one of the cylinders is misfiring.

(9) The engine 1 includes the injectors 7*a* and 7*b*, which respectively supply fuel to the cylinders 2*a* and 2*b* (FIG. 1A). When the misfiring state of the engine 1 is detected, based on the rotational speed NE of the engine 1 that has been detected by the rotation sensor 3*a*, the processor 11 controls the operations of the injectors 7*a* and 7*b* to stop the engine 1 (FIG. 7). For example, the normal cylinder and the misfiring cylinder are estimated, based on the change characteristics (fluctuation pattern) of the rotational speed NE of the engine 1, and the operations of the injectors 7*a* and 7*b* are controlled to stop the fuel supply to the normal cylinder and stop the engine 1, so that the catalyst device 9 can be protected. In this case, even though the misfiring state is erroneously detected, the engine 1 is capable of continuously operating in such a state. Therefore, the convenience of the user is not impaired.

(10) The engine 1 is a V-type two-cylinder engine widely used as a small-sized general engine (FIG. 1A to FIG. 1C). The use of the detection value of the rotation sensor 3*a* enables early detection of the misfiring state of the engine 1 even with a simple configuration as in a small-sized general engine, and enables protection of the catalyst device 9 in an appropriate manner.

In the above embodiments, an example in which the apparatus 20 is applied to the spark ignition type of air-cooled four-stroke V-type two-cylinder engine 1 has been described. However, the engine including a plurality of cylinders and a catalyst device is not limited to such an engine. Also for compression ignition type, water-cooled type, two-stroke, horizontally opposed type, series type, and engine with three or more cylinders, a misfiring state in which a part of the cylinders is misfiring is detectable, based on rotational fluctuation in one cycle. In addition, the engine 1 of a horizontal type (a horizontal axis type) that makes the power available in the horizontal direction has been exemplified in FIG. 1B, FIG. 1C, and the like. However, a vertical type (a vertical axis type) that makes the power available in the vertical direction may be used.

In the above embodiments, an example of detecting the misfiring state of the engine 1, when the state in which the exhaust gas temperature Tex exceeds the threshold T0 continues, has been described with reference to FIG. 8A and the like. In addition, an example of detecting the misfiring state of the engine 1, when the rising speed ΔTex of the exhaust gas temperature Tex exceeds the threshold ΔT0, has been described with reference to FIG. 8B and the like. However, the detection of the misfiring state of the engine based on the temperature of the exhaust gas is not limited to such examples. For example, when the state in which the exhaust gas temperature Tex exceeds the threshold T0 continues and the rising speed ΔTex of the exhaust gas temperature Tex exceeds the threshold ΔT0, the misfiring state of the engine 1 may be detected.

Heretofore, the present invention has been described as the misfire detection apparatus 20 for a multi-cylinder engine. However, the present invention can also be used as a misfire detection method of the multi-cylinder engine for detecting a misfiring state in which any of the plurality of cylinders 2*a* and 2*b* in the engine 1 is misfiring, the engine 1 including the plurality of cylinders 2*a* and 2*b* and the catalyst device 9, which purifies the exhaust gas from the plurality of cylinders 2*a* and 2*b*. That is, the misfire detection method of the multi-cylinder engine includes detecting the misfiring state of the engine 1, based on the rotational speed NE of the engine 1 (step S5 in FIG. 6).

The above description is only an example, and the present invention is not limited to the above embodiment and modifications, unless impairing features of the present invention. The above embodiment can be combined as desired with one or more of the above modifications. The modifications can also be combined with one another.

REFERENCE SIGNS LIST

1 engine, 2*a* first cylinder, 2*b* second cylinder, 3 crankshaft, 3*a* rotation sensor, 6 throttle valve, 6*a* throttle valve actuator, 7*a*, 7*b* injector, 8*a*, 8*b* ignition plug, 9 catalyst device, 9*a* exhaust gas temperature sensor, 10 electronic control unit, 11 processor, 12 memory, 13 air cleaner, 15 muffler, 20 misfire detection apparatus for multi-cylinder engine (apparatus).

The invention claimed is:

1. A misfire detection apparatus for a multi-cylinder engine, configured to detect a misfiring state in which any of a plurality of cylinders in the engine is misfiring, the engine including: the plurality of cylinders, and a catalyst device configured to purify exhaust gas from the plurality of cylinders, comprising:

a rotation sensor configured to detect a rotational speed of the engine; and an electronic control unit including a processor and a memory coupled to the processor and configured to control operation of the engine, wherein the engine is a four-stroke V-type two-cylinder engine that makes two rotations per cycle, and includes injectors respectively configured to supply fuel to each of the plurality of cylinders, wherein the processor:

determines whether cranking of the engine has ended;

when it is determined that the cranking has ended, determines whether the rotational speed of the engine decreases;

when it is determined that the rotational speed does not decrease, determines that a startup period in which the rotational speed increases after the cranking ends is in progress and determines whether the rotational speed of the engine instantaneously increases twice for every two rotations of the engine based on change characteristics of the rotational speed detected by the rotation sensor and detects the misfiring state of the engine based on a determination result in the startup period;

estimates one of the plurality of cylinders in which the rotational speed instantaneously increases as a normal cylinder in which normal combustion is performed, and estimates the other of the plurality of cylinders as a misfiring cylinder, when the misfiring state of the engine is detected based on the rotational speed detected by the rotation sensor;

controls operations of the injectors to stop fuel supply to the normal cylinder; and controls operations of the injectors to restart fuel supply to the normal cylinder and to stop fuel supply to the misfiring cylinder, when operation of the engine continues after stopping fuel supply to the normal cylinder.

2. The misfire detection apparatus according to claim 1, further comprising:

an exhaust gas temperature sensor configured to detect an exhaust gas temperature of the engine, wherein the processor detects the misfiring state of the engine based on the rotational speed detected by the rotation sensor or the exhaust gas temperature detected by the exhaust gas temperature sensor.

3. The misfire detection apparatus according to claim 2, wherein the exhaust gas temperature sensor detects the exhaust gas temperature after passing through the catalyst device.

4. The misfire detection apparatus according to claim 2, wherein the engine includes a throttle valve configured to adjust an amount of fresh air to be supplied to the plurality of cylinders, wherein the processor:

detects the misfiring state of the engine based on the exhaust gas temperature detected by the exhaust gas temperature sensor after the cranking of the engine ends and after the startup period elapses; and controls operation of the throttle valve to stop the engine when the misfiring state of the engine is detected based on the exhaust gas temperature detected by the exhaust gas temperature sensor.

5. The misfire detection apparatus according to claim 4, wherein the processor detects the misfiring state of the engine when a state in which the exhaust gas temperature detected by the exhaust gas temperature sensor exceeds a threshold continues for a predetermined time period after the startup period elapses.

6. The misfire detection apparatus according to claim 4, wherein the processor detects the misfiring state of the engine when a rising speed of the exhaust gas temperature detected by the exhaust gas temperature sensor exceeds a threshold after the startup period elapses.

7. A misfire detection method for a multi-cylinder engine, configured to detect a misfiring state in which any of a plurality of cylinders in the engine is misfiring, the engine including: the plurality of cylinders, and a catalyst device configured to purify exhaust gas from the plurality of cylinders, wherein the engine is a four-stroke V-type two-cylinder engine that makes two rotations per cycle, and includes injectors respectively configured to supply fuel to each of the plurality of cylinders, wherein the method comprises the steps of:

determining whether cranking of the engine has ended;

when it is determined that the cranking has ended, determining whether a rotational speed of the engine decreases;

when it is determined that the rotational speed does not decrease, determining that a startup period in which the rotational speed increases after the cranking ends is in progress and determining whether the rotational speed of the engine instantaneously increases twice for every two rotations of the engine based on change characteristics of the rotational speed and detecting the misfiring state of the engine based on a determination result in the startup period;

estimating one of the plurality of cylinders in which the rotational speed instantaneously increases as a normal cylinder in which normal combustion is performed, and estimating the other of the plurality of cylinders as a misfiring cylinder, when the misfiring state of the engine is detected based on the rotational speed;

controlling operations of the injectors to stop fuel supply to the normal cylinder; and controlling operations of the injectors to restart fuel supply to the normal cylinder and to stop fuel supply to the misfiring cylinder, when operation of the engine continues after stopping fuel supply to the normal cylinder.

* * * * *